(12) United States Patent
Lea-Wilson et al.

(10) Patent No.: US 8,020,582 B2
(45) Date of Patent: Sep. 20, 2011

(54) EXCESS FLOW VALVE

(75) Inventors: Mark A. Lea-Wilson, Edmonton (CA); Dan Brian F. Fajayan, Edmonton (CA)

(73) Assignee: Plainsman Manufacturing Inc., Edmonton, Alberta (CA)

( * ) Notice: Subject to any disclaimer, the term of this patent is extended or adjusted under 35 U.S.C. 154(b) by 407 days.

(21) Appl. No.: 11/627,956

(22) Filed: Jan. 27, 2007

(65) Prior Publication Data
US 2008/0178946 A1  Jul. 31, 2008

(51) Int. Cl.
*F16K 17/34* (2006.01)
(52) U.S. Cl. ........ 137/460; 137/498; 137/517; 137/543; 137/543.13; 251/252
(58) Field of Classification Search .................. 137/460, 137/498, 504, 517, 543, 543.13; 251/252
See application file for complete search history.

(56) References Cited

U.S. PATENT DOCUMENTS

| | | | | |
|---|---|---|---|---|
| 2,647,531 A | * | 8/1953 | Berck | 137/504 |
| 2,663,313 A | * | 12/1953 | Doyle | 137/479 |
| 3,106,226 A | * | 10/1963 | Machen | 137/517 |
| 3,377,109 A | * | 4/1968 | Scott | 137/498 |
| 3,807,442 A | | 4/1974 | Summer et al. | |
| 4,174,731 A | | 11/1979 | Sturgis et al. | |
| 4,681,141 A | * | 7/1987 | Wang | 251/252 |
| 4,830,046 A | | 5/1989 | Holt | |
| 5,105,850 A | * | 4/1992 | Harris | 137/513.3 |
| 5,462,081 A | | 10/1995 | Perusek et al. | |
| 5,465,751 A | | 11/1995 | Newton | |
| 5,472,008 A | | 12/1995 | Boarin | |
| 6,019,115 A | | 2/2000 | Sanders | |
| 6,123,101 A | | 9/2000 | Velie et al. | |
| 6,135,134 A | | 10/2000 | Taylor | |
| 6,363,963 B1 | | 4/2002 | White | |
| 6,401,741 B1 | | 6/2002 | Cain | |
| 6,923,206 B2 | | 8/2005 | Glover et al. | |

FOREIGN PATENT DOCUMENTS

| | | |
|---|---|---|
| CA | 532182 | 10/1956 |
| CA | 974429 | 9/1975 |
| CA | 988391 | 5/1976 |
| CA | 2155683 | 2/1996 |
| CA | 2449216 | 5/2002 |
| CA | 2524740 | 11/2004 |

* cited by examiner

*Primary Examiner* — Stephen M Hepperle
*Assistant Examiner* — William McCalister
(74) *Attorney, Agent, or Firm* — Anthony R. Lambert

(57) ABSTRACT

An excess flow valve having a housing, a valve seat, a poppet and an adjusting ring. The adjusting ring lies within a bore in the housing and there is an opening through the housing permitting access to the adjustment ring from outside the bore of the housing. Rotation of the adjusting ring controls the maximum travel distance between the poppet and the valve seat. In an embodiment a travelling valve guide is rotatably mounted within the adjustment ring to change the maximum travel distance between the poppet and the valve seat. A spring may bias the poppet and the valve seat away from each other.

7 Claims, 16 Drawing Sheets

US 8,020,582 B2

EXCESS FLOW VALVE

BACKGROUND

Excess flow valves are commonly used in the gas industry. These valves are commonly used in gas gathering and gas delivery systems and are intended to regulate the flow of gas, vapour, liquid or multi-phase fluid therethrough by limiting the flow rate to a predetermined maximum rate. They are also used in other fluid distribution systems such as water distribution systems. A typical excess flow valve comprises a sliding poppet inside a chamber capable of closing an opening in the chamber, and preventing the flow of fluid or gas therethrough. A spring is often used to urge the poppet to its open position away from the opening. As the flow rate reaches or exceeds the maximum rate, such as the rate allowed by the size of the opening and/or the force of the spring, the pressure differential causes the poppet to slide toward the opening, against the force of the spring, to regulate or close the valve. A difficulty, however, of using standard excess flow valves is that they cannot be adjusted and therefore cannot be used where the fluid or gas supply pressures and threshold flow rates may vary, without changing the valve or components of the valve.

Certain types of externally adjustable valve systems have been used in the past to enable systems to be adjusted to different flow rates and pressures without having to substantially replace critical components each time an adjustment is made. Such adjustment capabilities are designed to alleviate the difficulty of having to replace internal components, such as the spring, or change the size of the opening, each time different flow rates and pressures are encountered.

U.S. Pat. No. 6,019,115, issued on Feb. 1, 2000 by R. Gene Sanders describes an excess flow valve having a threaded member extending through the valve, which causes a retainer, threadably located on the member to move laterally within the camber. The threaded member that extends from outside the housing into the center of the bore requires additional seals to seal the bore.

SUMMARY

There is provided, in one embodiment, an excess flow valve that is easily adjustable from outside the housing of the excess flow valve. A valve seat and a valve guide are in a bore of the housing of the excess flow valve. A poppet is mounted in the bore and is spring biased towards the valve guide and away from the valve seat. The poppet is limited in motion by the valve guide and the valve seat. At least one of the valve seat and the valve guide is movable along the bore with respect to the other of the valve seat and the valve guide. An adjustment ring is mounted within the housing in the bore and cooperates with at least one of the valve seat and the valve guide to move the respective one of the valve seat and the valve guide. An opening through the housing permits access to the adjustment ring from outside the bore of the housing.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
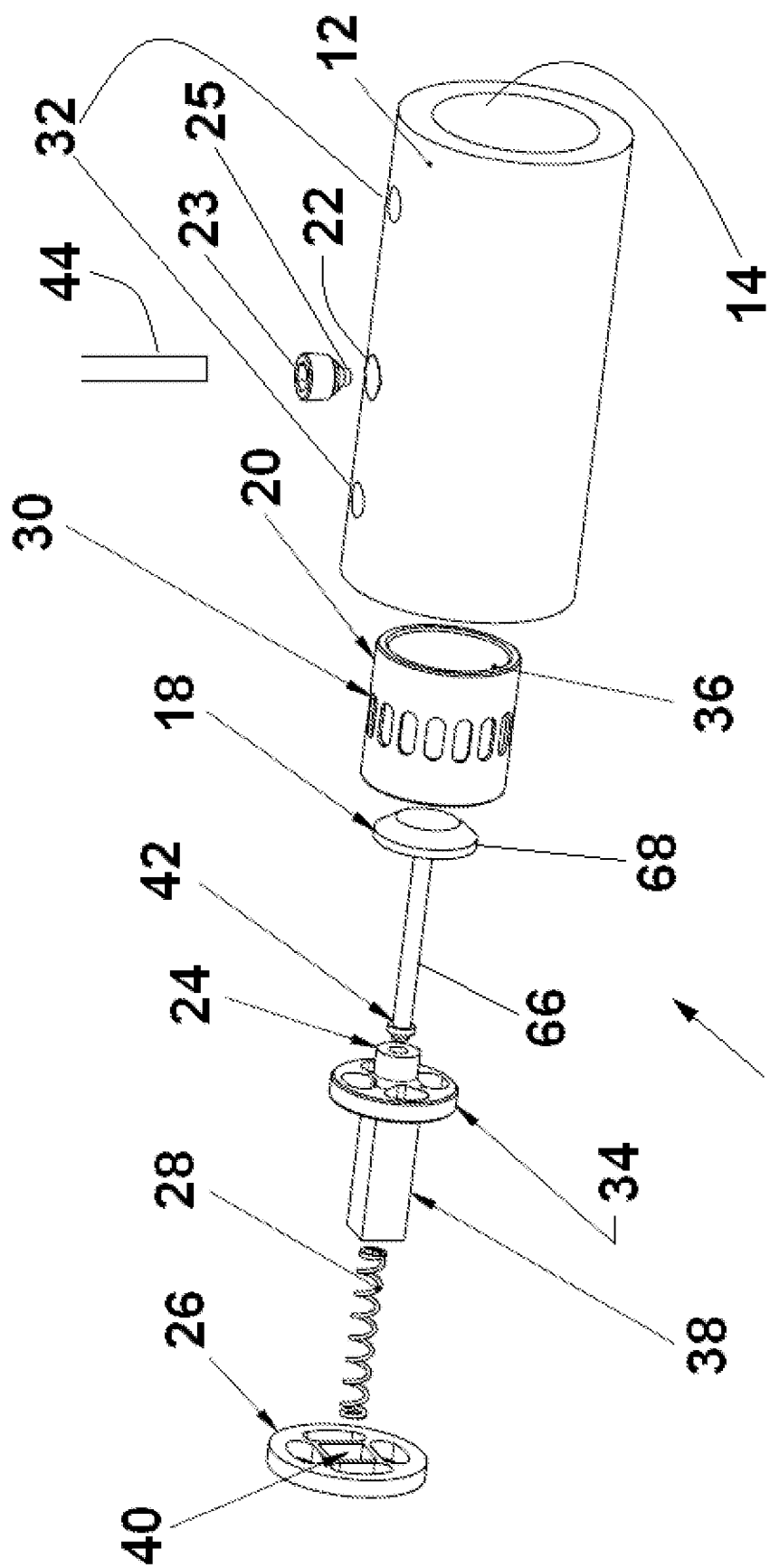
FIG. 1 is an exploded view of an embodiment of an excess flow valve.

In the claims, the word "comprising" is used in its inclusive sense and does not exclude other elements being present. The indefinite article "a" before a claim feature does not exclude more than one of the feature being present.

An embodiment of an excess flow valve is shown in FIGS. 1-5. An excess flow valve 10 has a housing 12 having a bore 14. A valve seat 16 lies within the bore 14 and a poppet 18 is movable within the bore 14. The poppet comprises a poppet stem 66 and a poppet head 68 adapted to seal against the valve seat 16. The poppet head 68 seals the valve 10 when in contact with the valve seat 16. An adjustment ring 20 lies within the bore and an opening through the housing 22 permits access to the adjustment ring 20 from outside the housing 12. As with the other adjustment rings disclosed here, the adjustment ring 20 sits with a sliding fit in the housing 12. The adjustment ring 20 does not have to create a seal with the housing 12. A travelling valve guide 24 lies within the adjustment ring 20. A retaining member 26 lies adjacent to the adjustment ring 20 within the bore 14. A spring 28 lies between the travelling valve guide 24 and the poppet stem 66. The spring 28 is constrained by the travelling valve guide 24 on one end and a spring retainer 42 on the other end. Manipulating slots or pockets 30 lie on the adjustment ring 20 and are accessible from outside the housing 12 through the opening through the housing 22. External bypass holes 32 connect the bore 14 to the exterior of the housing as is commonly done and so the function of the external bypass holes 32 will not be described here. External threading 34 lies on the exterior of the travelling valve guide 24 and the external threading 34 engages internal threading 36 of the adjustment ring 20. The travelling valve guide 24 has an anti-rotation profile 38 which engages an anti-rotation slot 40 of the retaining member 26. In the embodiment shown the anti-rotation profile 38 is rectangular and engages a rectangular anti-rotation slot 40. However, various types of anti-rotation profiles may be used, including for example a hex, a key or a triangle-shaped profile. A manipulating device 44 may operate on the manipulating slots 30 of the adjustment ring 20 from outside of the housing 12. A modified pipe plug 23 is inserted into and seals the opening through the housing 22 when the manipulating device is not operating on the adjustment ring 20. The pipe plug 23 also acts as a locking device with a spigot 25 engaging the manipulating slots 30, thereby preventing undesired movement of the adjustment ring 20 during operation. The pipe plug 23 may, for example, be threaded into the opening through the housing 22. If the adjustment ring 20 is configured to provide a seal with the housing 12, the pipe plug 23 need not form a seal; however, it is recommended that the pipe plug 23 be used to form a seal. A spring retainer 42 lies on the end of the poppet stem 66 opposite to the poppet head 68.

In the embodiments shown in this patent document the flow of fluid is from bottom to top as seen in the drawings. Equivalently, in the embodiments of FIGS. 1-14, fluid moves in the direction from the valve guide towards the valve seat, and in the embodiment of FIGS. 15 and 16 fluid moves in the direction from the valve seat towards the valve guide. In the embodiment of FIGS. 1-5 the differential pressure across the poppet 18 depends on the flow rate through the excess flow valve 10. The poppet 18 lies in a closed position when the poppet 18 is adjacent to the valve seat 16. The amount of force that pushes the poppet 18 towards a closed position depends on the flow rate. The force keeping the valve open depends on the spring constant and the length of spring compressed by the poppet 18 as it moves towards the valve seat 16. When the flow gets too high for a given spring constant and travel distance, the valve closes. So, adjusting the compression length changes the trigger point at which excess flow closes the valve. A predetermined flow rate will displace the poppet 18 towards the closed position a predetermined amount, which may depend on, for example the spring constant, poppet outer diameter, valve bore inner diameter and/or other factors. A greater flow will displace the poppet 18 further towards the closed position. If the distance from the poppet 18 to the valve seat 16 is less than the predetermined displacement, the valve will close at a flow rate less than the predetermined flow rate. Therefore changing the distance between the un-displaced poppet 18 and the valve seat 16 changes the closing flow rate.

Operation of the embodiment of the excess flow valve 10 shown in FIGS. 1-5 will now be described. The manipulating device 44 is inserted into the opening through the housing 22. The manipulating device 44 rotates the adjustment ring 20 by moving the manipulating slots 30 past the opening through the housing 22. Rotation of the adjustment ring 20 causes the travelling valve guide 24 to move longitudinally within the housing 12 either toward or away from the valve seat 16. The anti-rotation profile 38 of the travelling valve guide 24 engages retaining member 26 to prevent the travelling valve guide 24 from rotating in unison with the adjustment ring 20. External threading 34 on the travelling valve guide 24 is engaged by the internal threading 36 of the adjustment ring 20 to cause movement of the travelling valve guide 24 relative to the adjustment ring 20. The movement of the travelling valve guide 24 changes the maximum travel distance of the poppet head 68 between the travelling valve guide 24 and the valve seat 16. The spring 28 biases the poppet head 68 towards the travelling valve guide 24 and away from the valve seat 16. Movement of fluid through the excess flow valve 10 from the travelling valve guide 24 towards the valve seat 16, if sufficiently strong, will push against the poppet head 68 thereby urging the poppet head 68 towards the valve seat 16. The spring 28 attaches to and biases apart the spring retainer 42 and the travelling valve guide 24.

Figure 2:
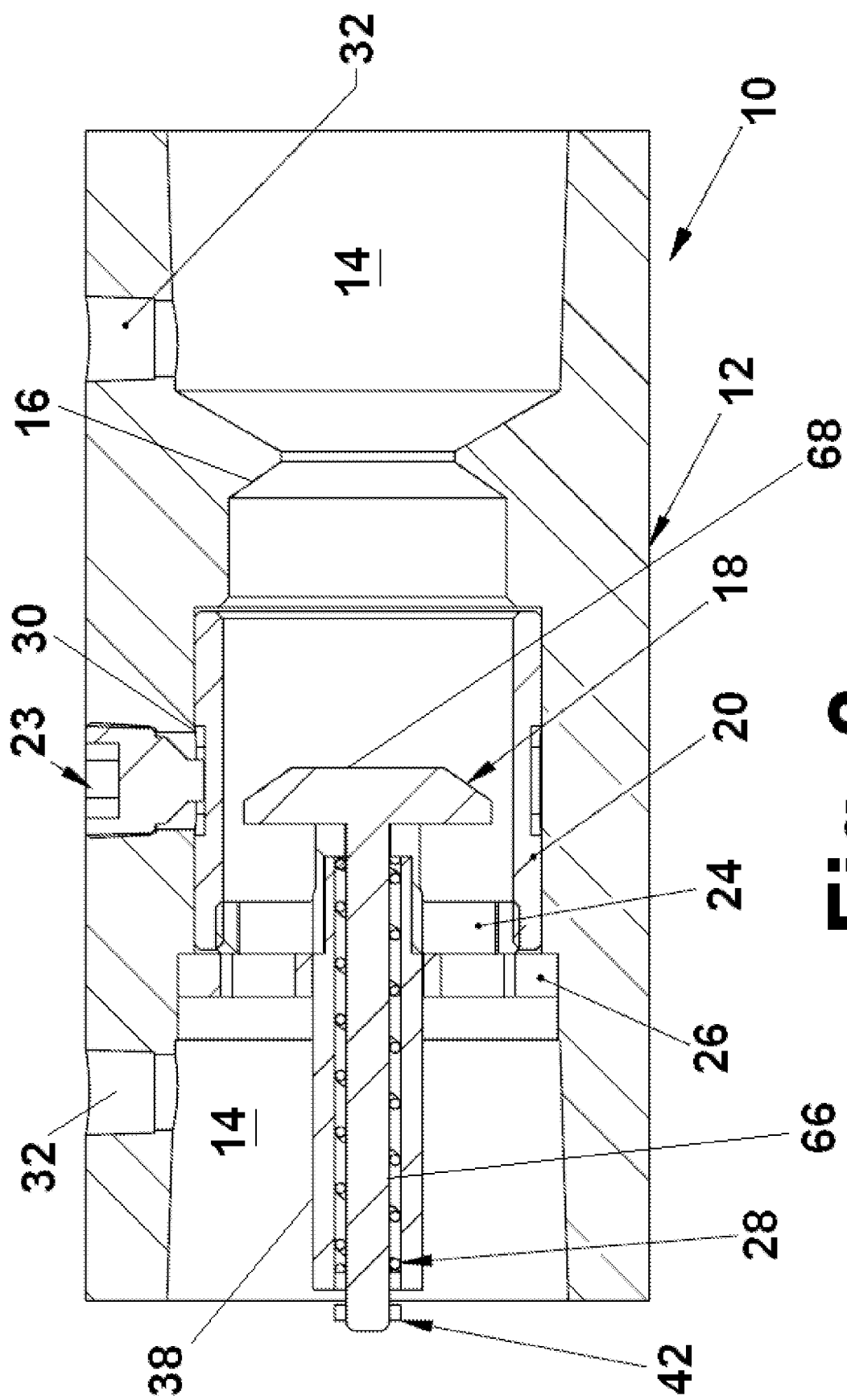
FIG. 2 is a section view of the embodiment of the excess flow valve of FIG. 1 in an open position for large flow.

FIG. 2 shows the excess flow valve 10 of FIG. 1 in an open position for large fluid flow. The travelling valve guide 24 is adjacent the retaining member 26 at the furthest possible position the travelling valve guide 24 can sit away from the valve seat 16. The position of the travelling valve guide 24 allows the poppet 18 to have the maximum travel distance between the travelling valve guide 24 and the valve seat 16. The poppet head 68 is shown at a maximum distance away from the valve seat 16, since the poppet head 68 is restricted by the travelling valve guide 24 from being further away from the valve seat 16. The flow of fluid in the valve provides a force that is less than the force required to push the poppet 18 towards the valve seat 16 against the compression of the spring 28

Figure 3:
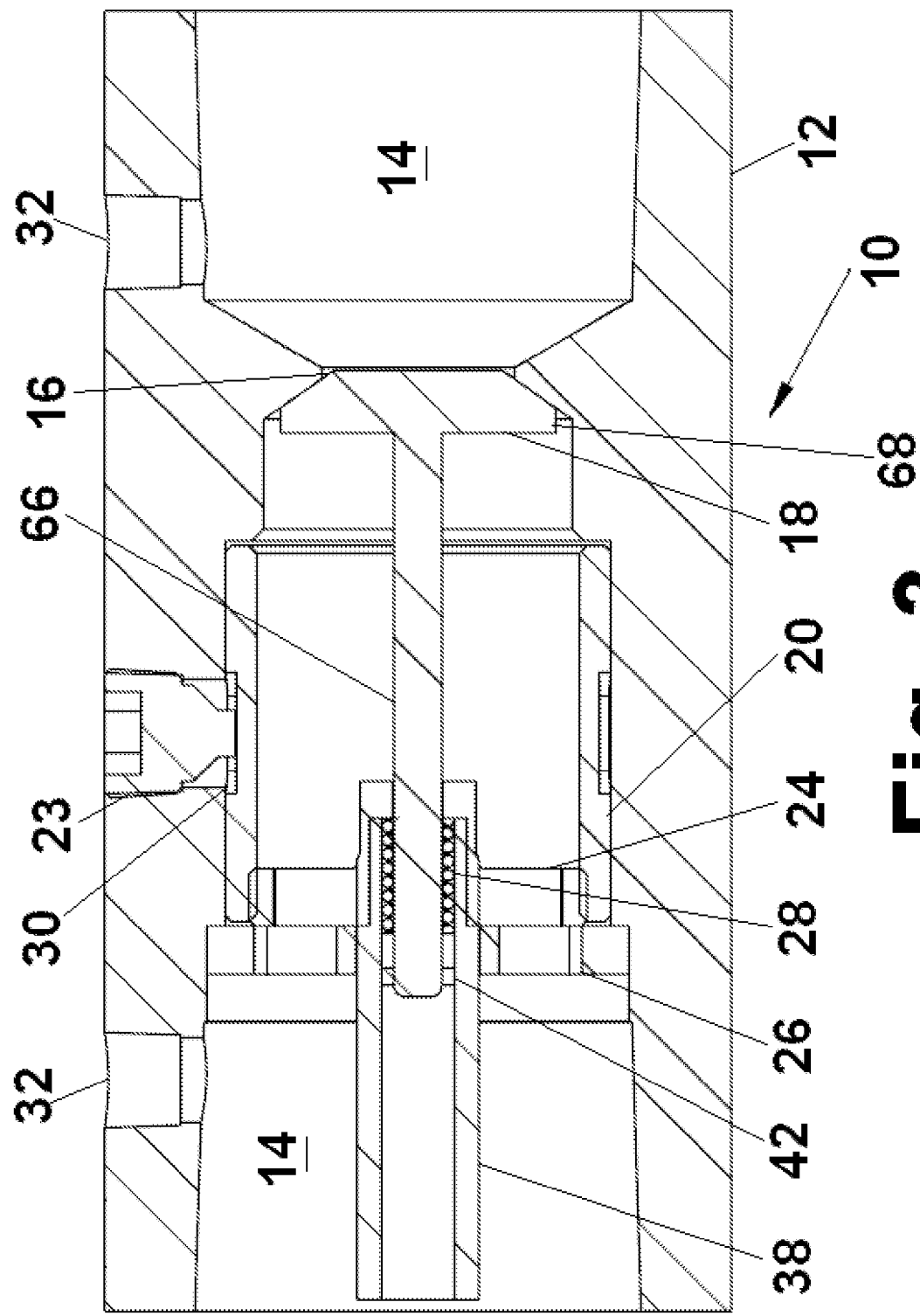
FIG. 3 is a section view of the embodiment of the excess flow valve of FIG. 1 in a closed position for large flow.

FIG. 3 shows the excess flow valve 10 of FIG. 1 in a closed position for large flow. The travelling valve guide 24 is adjacent the retaining member 26 at the furthest possible position the travelling valve guide 24 can sit away from the valve seat 16. The poppet head 68 is shown adjacent to the valve seat 16. In the embodiment shown, the flow of fluid is sufficiently strong to displace the poppet 18 so that it is adjacent to the valve seat 16. In this case, a large flow is necessary to close the valve, since the force of the flow of fluid must act against the compression force of the fully compressed spring 28.

Figure 4:
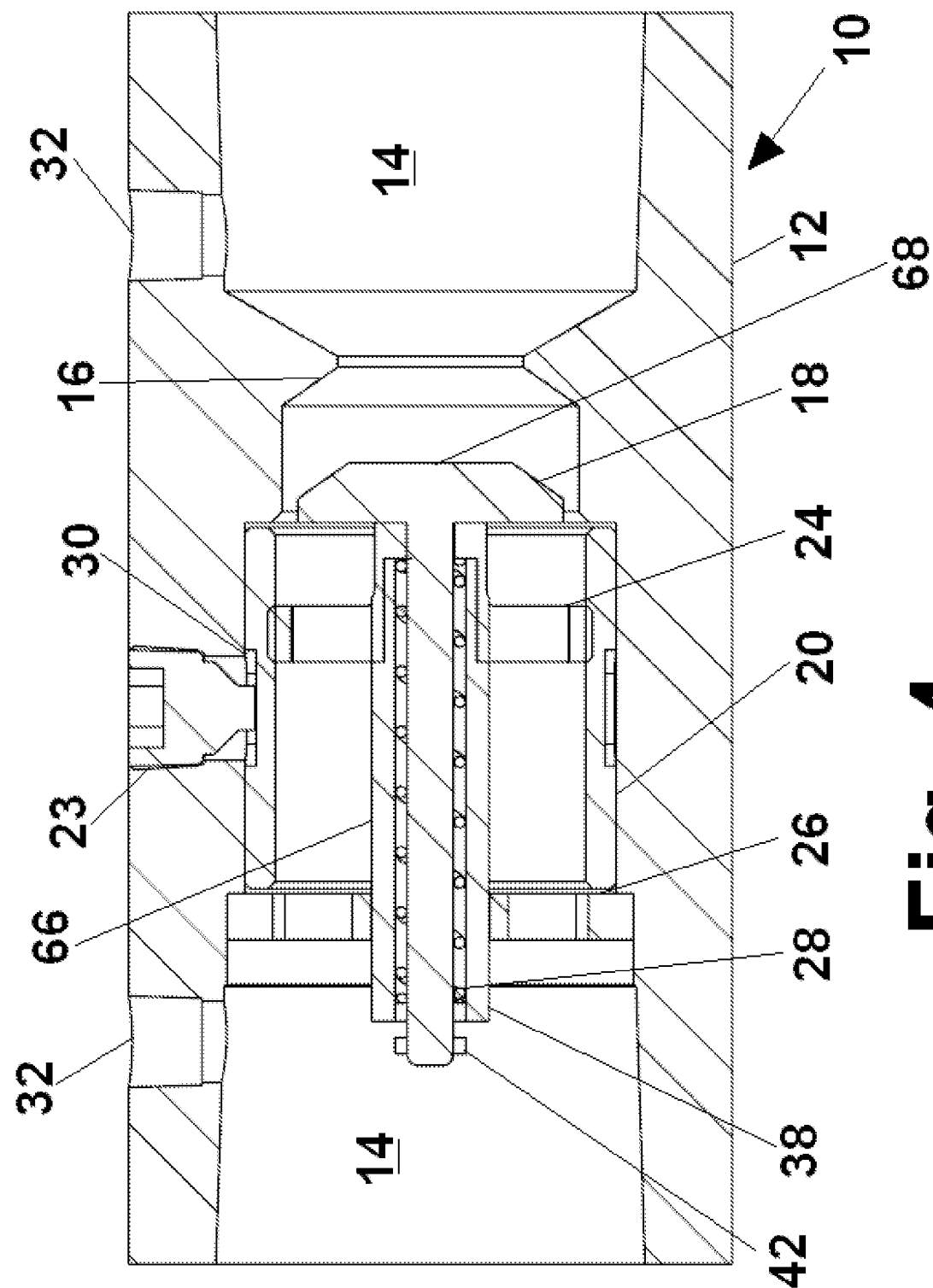
FIG. 4 is a section view of the embodiment of the excess flow valve of FIG. 1 in an open position for small flow.

FIG. 4 shows the excess flow valve 10 of FIG. 1 in an open position for small flow. The travelling valve guide 24 is located closer to the valve seat 16 and further from the retaining member 26 than the travelling valve guide was in the embodiments shown in FIGS. 2 and 3. The location of the travelling valve guide 24 in FIG. 4 causes the maximum travel distance of the poppet head 68 to be smaller than the maximum travel distance of the poppet head 68 in FIGS. 2 and 3. In this embodiment, the flow of fluid in the valve provides a force that is less than the force required to push the poppet 18 against the compression of the spring towards the valve seat 16.

Figure 5:
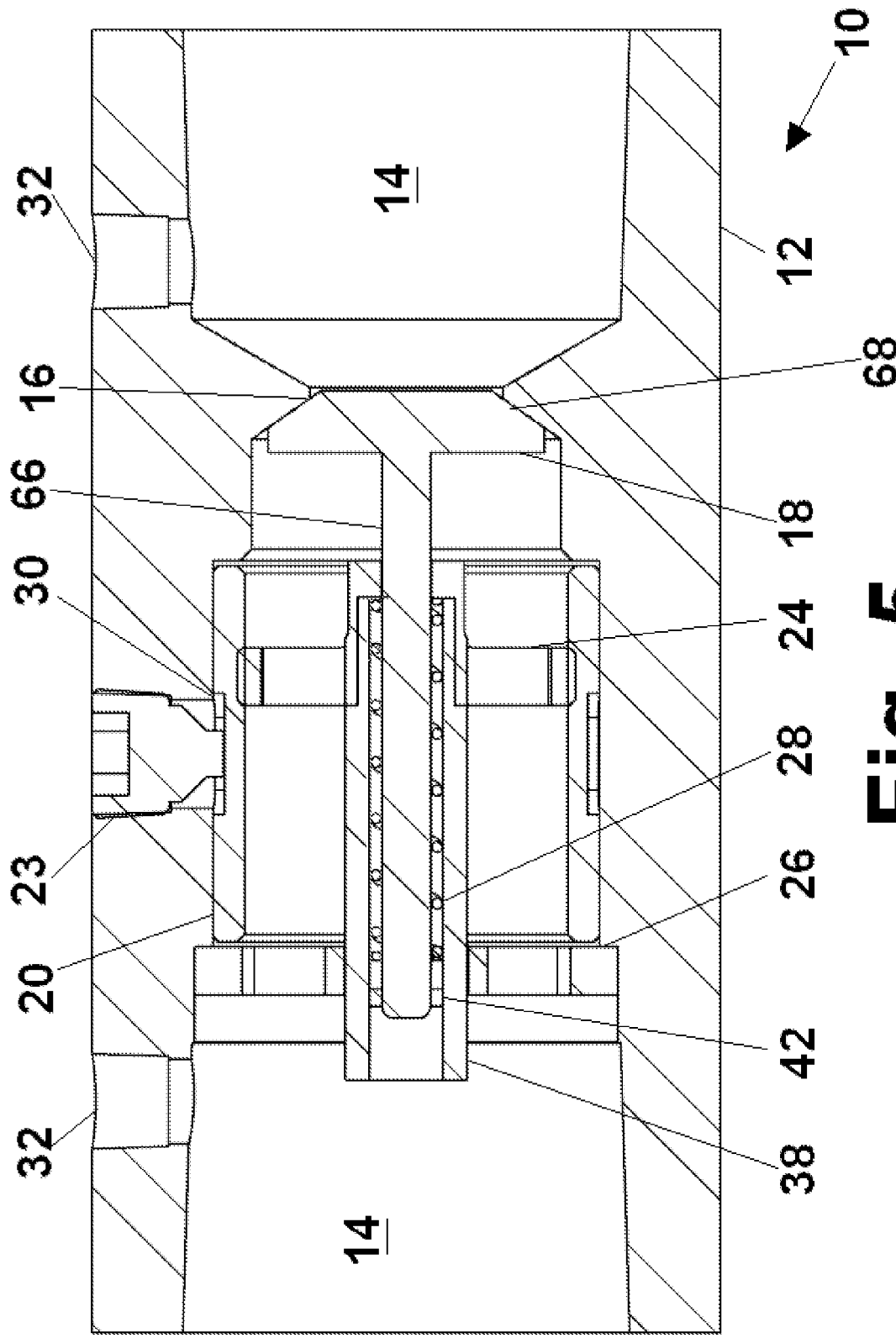
FIG. 5 is a section view of the embodiment of the excess flow valve of FIG. 1 in a closed position for small flow.

FIG. 5 shows the excess flow valve 10 of FIG. 1 in a closed position for small flow. The travelling valve guide 24 is located closer to the valve seat 16 and further from the retaining member 26 than the travelling valve guide was in the embodiments shown in FIGS. 2 and 3. The poppet head 68 is shown adjacent to the valve seat 16. In this embodiment, the flow of fluid required to displace the poppet 18 to the valve seat is less than the flow of fluid required to displace the poppet 18 to the valve seat 16 in FIG. 2.

An embodiment of an excess flow valve is shown in FIGS. 6-9, which is similar to the embodiment of FIGS. 1-5 but provides a further example of a mechanism for adjustment of the position of a valve guide that limits motion of the poppet of an excess flow valve. In this embodiment a travelling valve guide 124 has a poppet retainer 154 which receives the poppet 18. An adjustment ring 120 has a cut through 146. The cut through 146 may be an angled or helical cut through. A knob 148 on the travelling valve guide 124 lies within a cut through 146 of the adjustment ring 120 and within a keyway 150 in the housing 12. The knob 148 is movable within the cut through 146 and is movable within a keyway 150 in the housing 12. In other embodiments the knob 148 may be for example a roller, a cam follower or a dowel.

Operation of the embodiment of the excess flow valve 110 shown in FIGS. 6-9 will now be described. The manipulating device 44 (FIG. 1) rotates the adjustment ring 120 by moving the manipulating slots 30 past the opening through the housing 122. The keyway 150 in the housing 112 prevents the travelling valve guide 124 from rotating in unison with the adjustment ring 120 as the adjustment ring is rotated. As the adjustment ring 120 is rotated the travelling valve guide 124 moves longitudinally within the housing 12 and the knob 148 moves within the keyway 150 in the housing. The knob 148 always lies within both the keyway 150 and the cut though 146, and so the rotation of the adjustment ring 120 causes the travelling valve guide 124 to move longitudinally between opposite ends of the adjustment ring 120.

Figure 6:
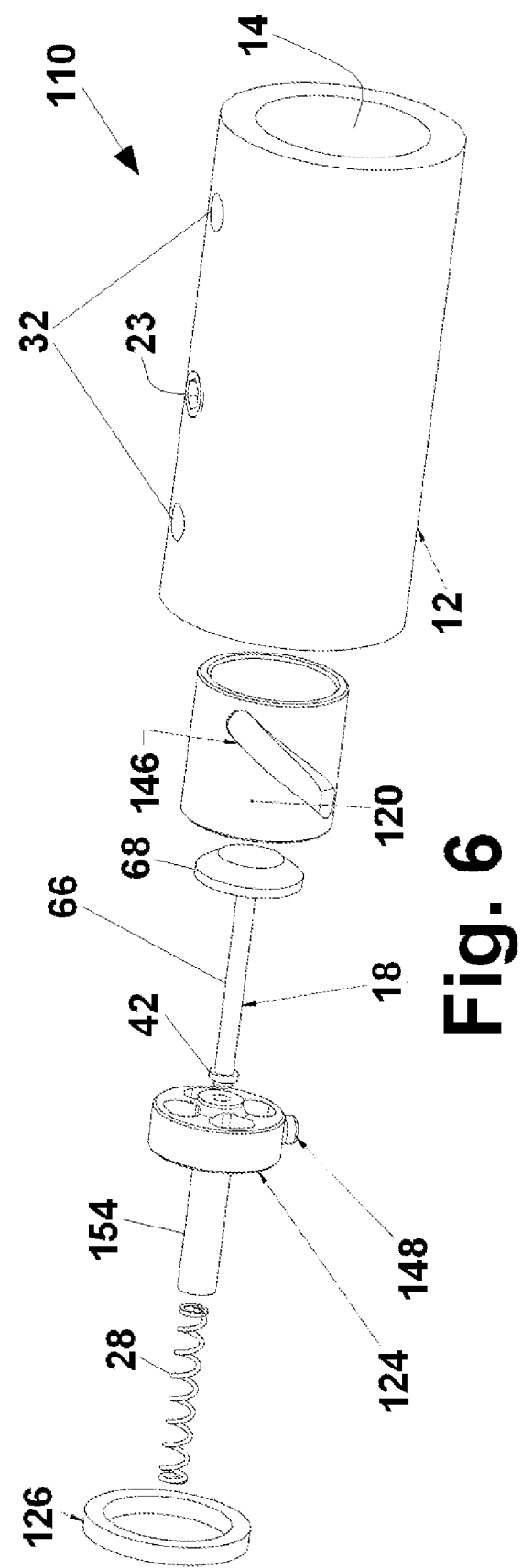
FIG. 6 is an exploded view of an embodiment of an excess flow valve.
Figure 7:
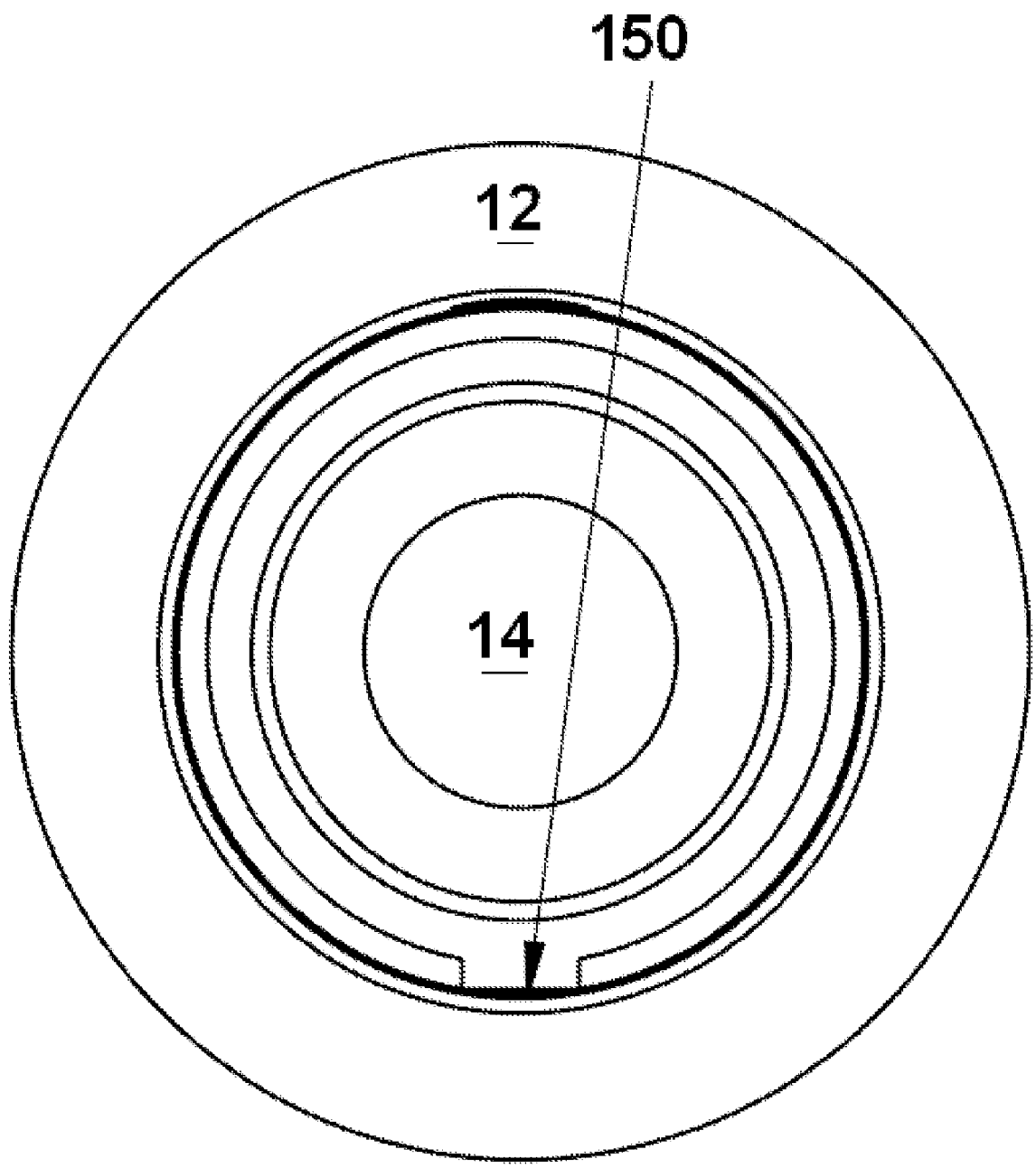
FIG. 7 is a front section view of the embodiment of the excess flow valve of FIG. 6.

FIG. 7 shows a section through the excess flow valve 110 of FIG. 6 showing the keyway 150 in the housing 12. The keyway 150 in the housing 12 may lie at other locations in the housing. However, when considering other locations for the keyway 150 it is important to keep in mind that the range of motion of the travelling valve guide 124 within the adjustment ring 120 in this embodiment is restricted by the longitudinal extension of the keyway 150 in the housing 112.

Figure 8:
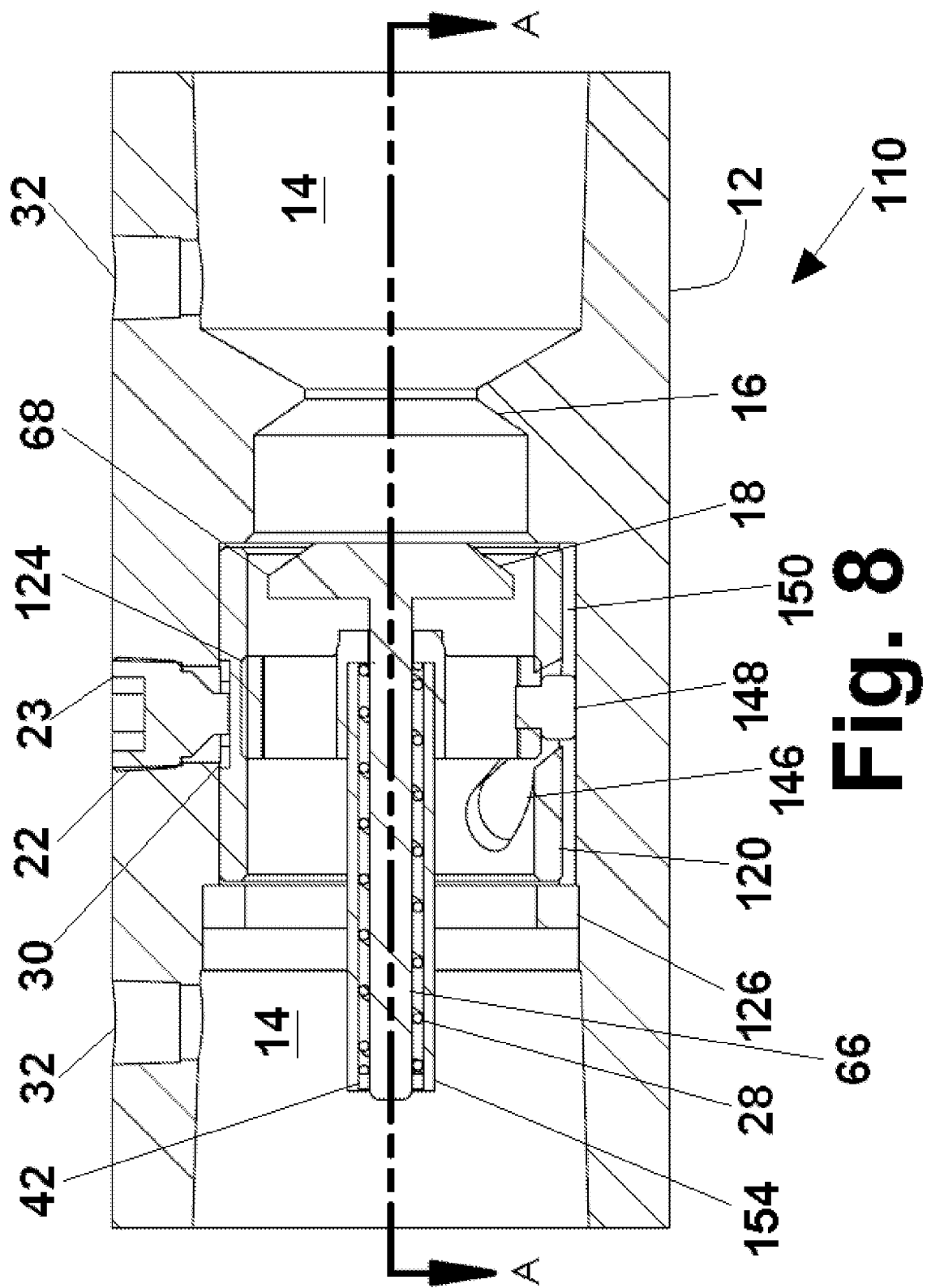
FIG. 8 is a partial side section and partial perspective view of the embodiment of the excess flow valve of FIG. 6 in an open position.

FIG. 8 shows a longitudinal section of the excess flow valve 110 of FIG. 6. The travelling valve guide 124 is located near the center of the adjustment ring 120. The knob 148 of the travelling valve guide 124 lies within the cut through 146 in the adjustment ring 120 and within the keyway 150 in the housing 112. The poppet head 68 lies within the bore 114 between the travelling valve guide 124 and the valve seat 16, although the poppet head 68 is not adjacent to either the travelling valve guide 124 or the valve seat 116. The flow of fluid through the excess flow valve 110 provides sufficient force to push against the compression of the spring and move the poppet head 68 towards the valve seat 16. However, the flow of fluid does not provide sufficient force to push the poppet head 68 to a closed position adjacent to the valve seat 16.

Figure 9:
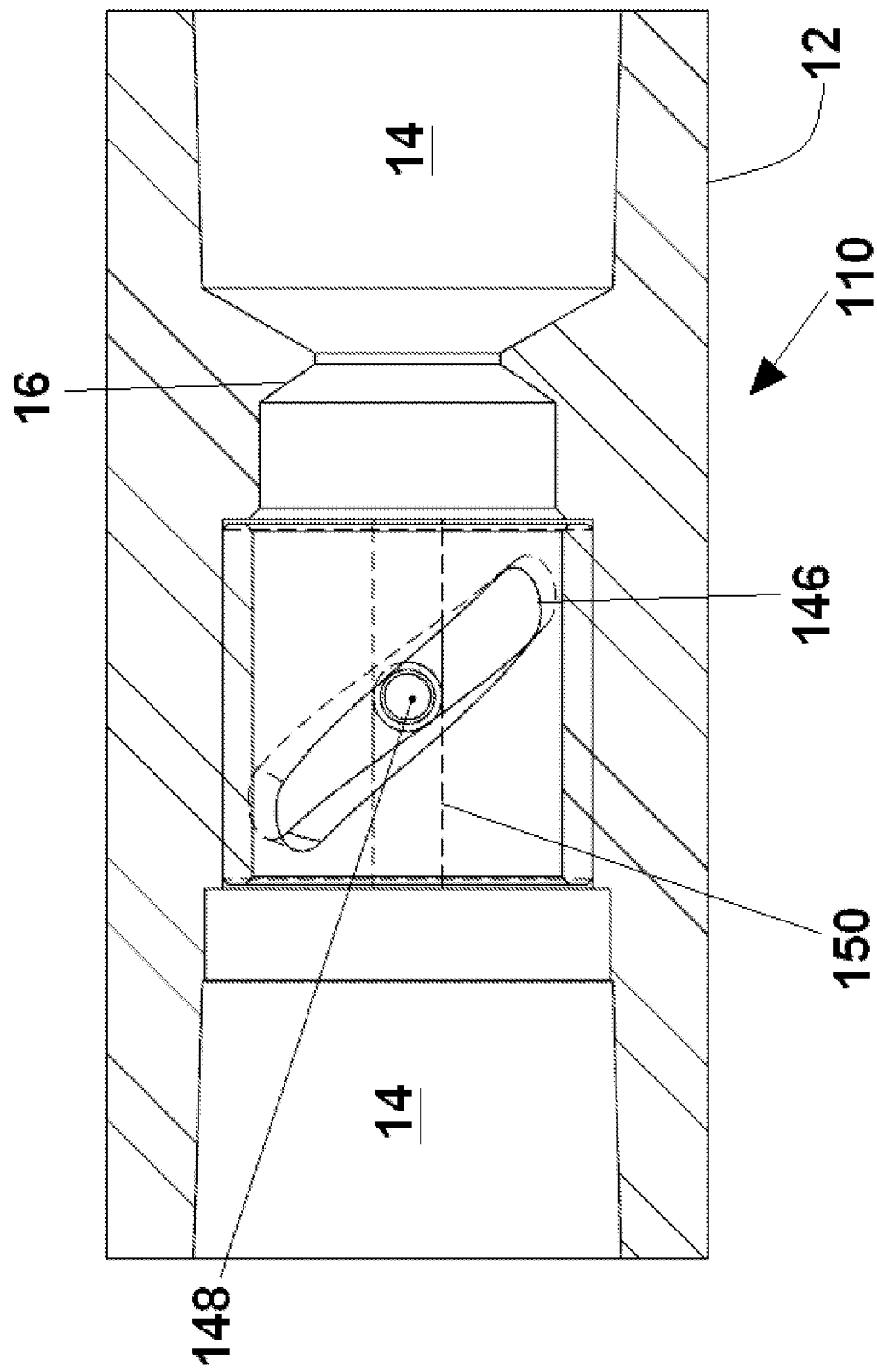
FIG. 9 is a partial side section and partial perspective view of the embodiment of the excess flow valve of FIG. 6 taken from the section A-A of FIG. 8.

FIG. 9 shows a section along the lines A-A of FIG. 8. The knob 148 is restricted to move within the keyway 150 in the housing. The rotation of the adjustment ring 120 functions to move the knob 150 towards or away from the valve seat 16 along the keyway 150 in the housing. In the embodiment of FIG. 9, if the adjustment ring 120 were rotated clockwise as seen from the valve seat 16 the knob 148 would move along the keyway 150 in the housing towards the valve seat 16. The travelling valve guide 124, having the knob 148 as a subcomponent, would move with the knob 148 towards the valve seat 16 and thereby reduce the maximum travel distance of the poppet head 68 (FIG. 8). In the embodiment of FIG. 9, if the adjustment ring 120 were rotated counterclockwise as seen from the valve seat 16, the knob 148 would move away from the valve seat 16. The travelling valve guide 124, having the knob 148 as a subcomponent, would move with the knob 148 away from the valve seat 16 and thereby increase the maximum travel distance of the poppet head 68 (FIG. 8).

Figure 10:
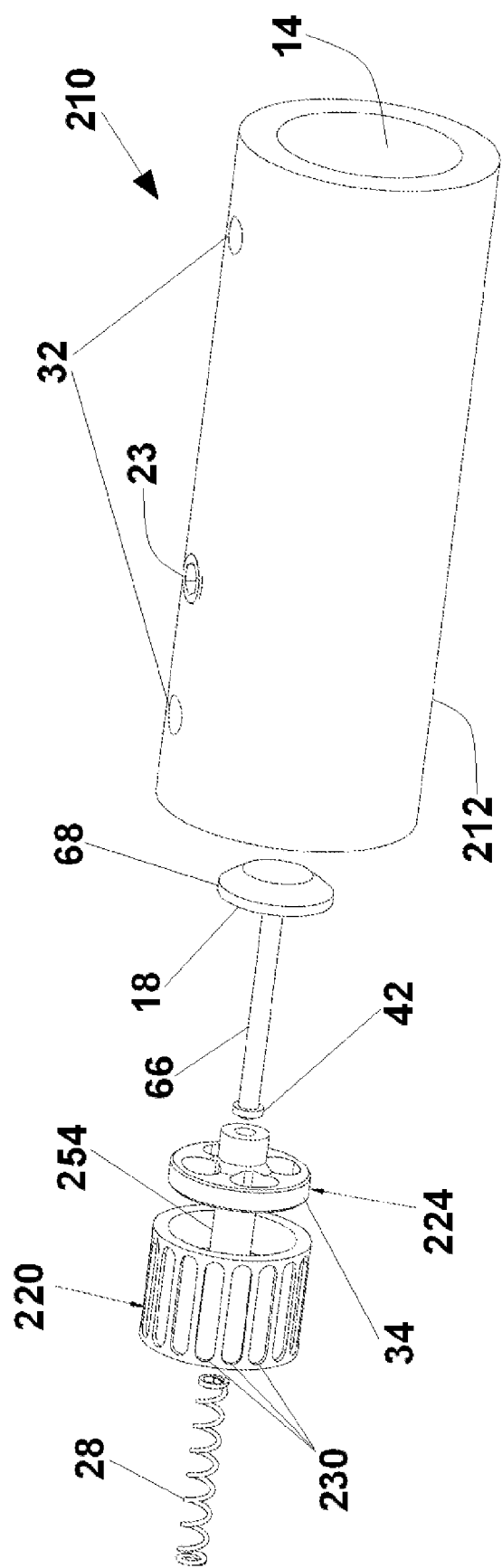
FIG. 10 is an exploded view of an embodiment of an excess flow valve.
Figure 11:
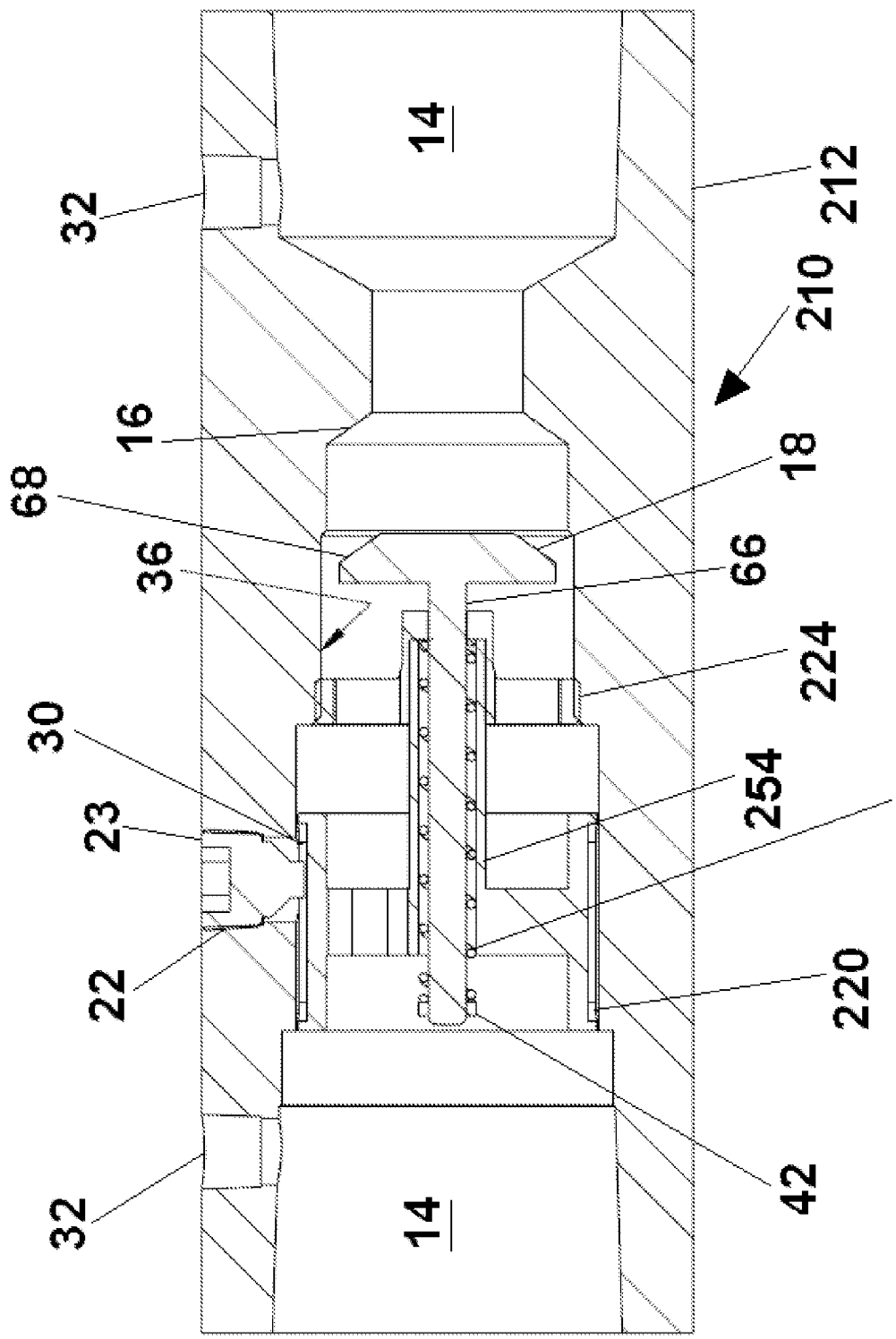
FIG. 11 is a side section view of the embodiment of the excess flow valve of FIG. 10 in an open position.

An embodiment of an excess flow valve 210 is shown in FIGS. 10 and 11 in which an adjustment ring is connected to a valve guide with a fixed link. A travelling valve guide 224 is fixedly connected to an adjustment ring 220. Manipulating slots 230 lie on the adjustment ring 220 and in this embodiment are longer than those in the embodiments shown in FIGS. 1-9. External threading 34 lies on the exterior of the travelling valve guide 224. As shown in FIG. 11, internal threading 36 lies on the interior of the housing 212. The travelling valve guide 224 has a poppet retainer 254 which receives the poppet stem 66 and the poppet retainer 254 fixedly attaches the travelling valve guide 224 to the adjustment ring 220.

Operation of the embodiment of the excess flow valve 210 shown in FIGS. 10 and 11 will now be described. Rotation of the adjustment ring 220 by the manipulating device 44 (FIG. 1) causes both the adjustment ring 220 and the travelling valve guide 224 to move longitudinally within the housing 212 either toward or away from the valve seat 216. External threading 34 on the travelling valve guide 224 is engaged by the internal threading 36 of the housing 212 to cause movement of the travelling valve guide 224 relative to the housing 212. The external threading may also, or exclusively, lie on the adjustment ring 220. The adjustment ring 220 and the travelling valve guide 224 may be combined into a single component of the excess flow valve 210. The travelling valve guide 224 is fixed to the adjustment ring 220 and so rotation of the adjustment ring 220 causes movement of the travelling valve guide 224 and adjustment ring 220 longitudinally within the housing 212. The manipulating slots 230 in this embodiment extend further longitudinally within the bore 14 since the adjustment ring 220 moves longitudinally within the bore 14 relative to the housing 212. As the adjustment ring 220 moves longitudinally relative to the housing 212, the manipulating slots 230 remain accessible through the opening through the housing 22.

Figure 12:
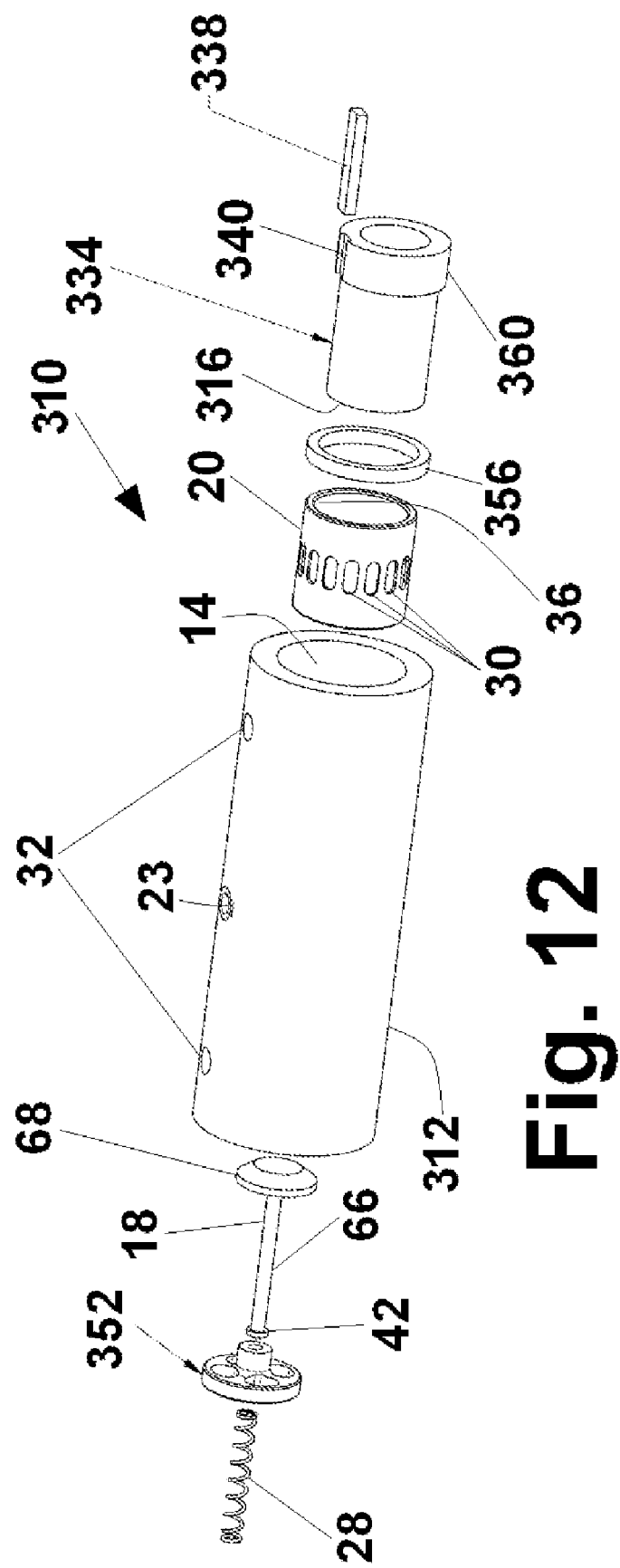
FIG. 12 is an exploded view of an embodiment of an excess flow valve.
Figure 13:
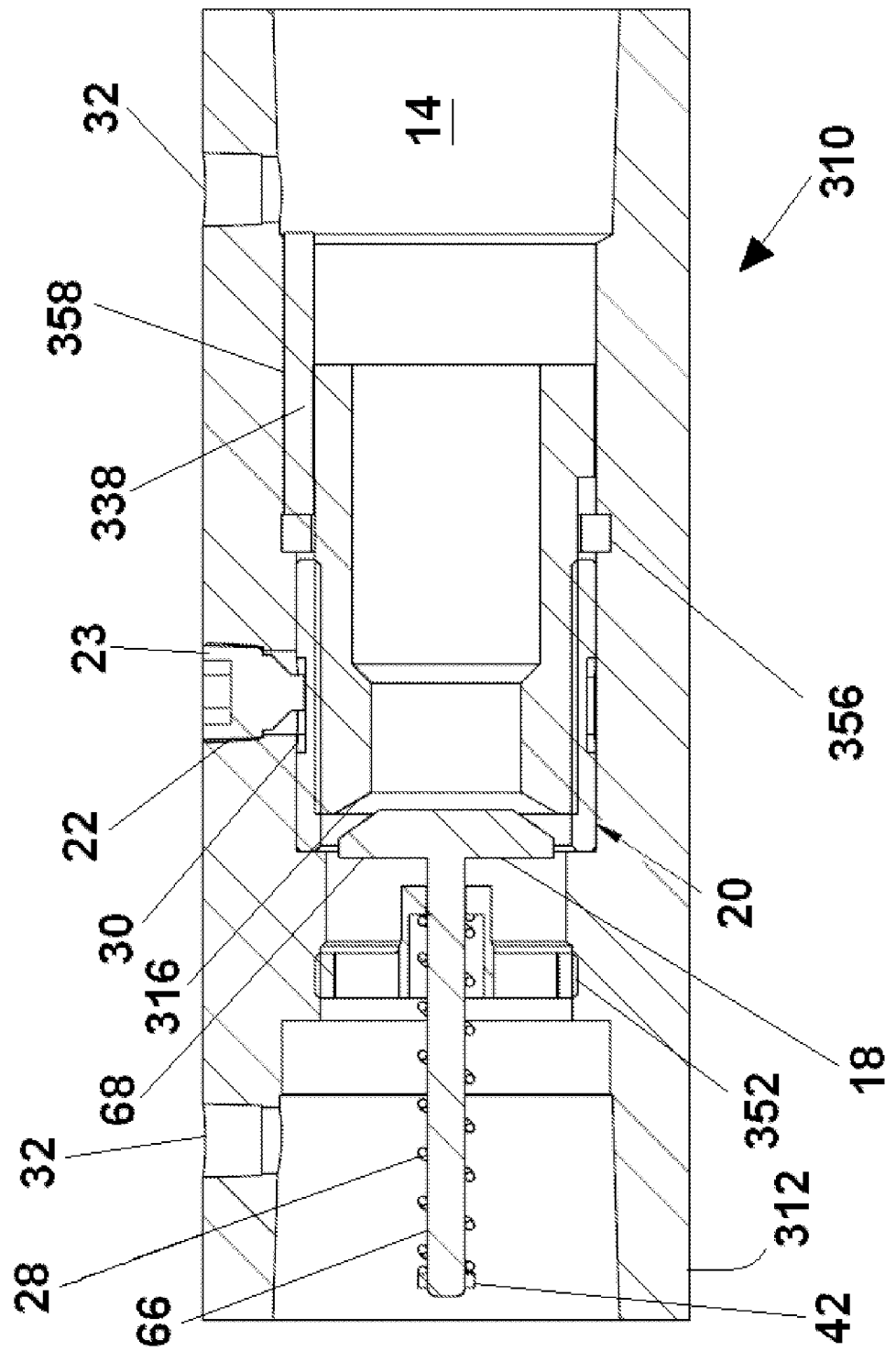
FIG. 13 is a side section view of the embodiment of the excess flow valve of FIG. 12 in an open position for small flow.
Figure 14:
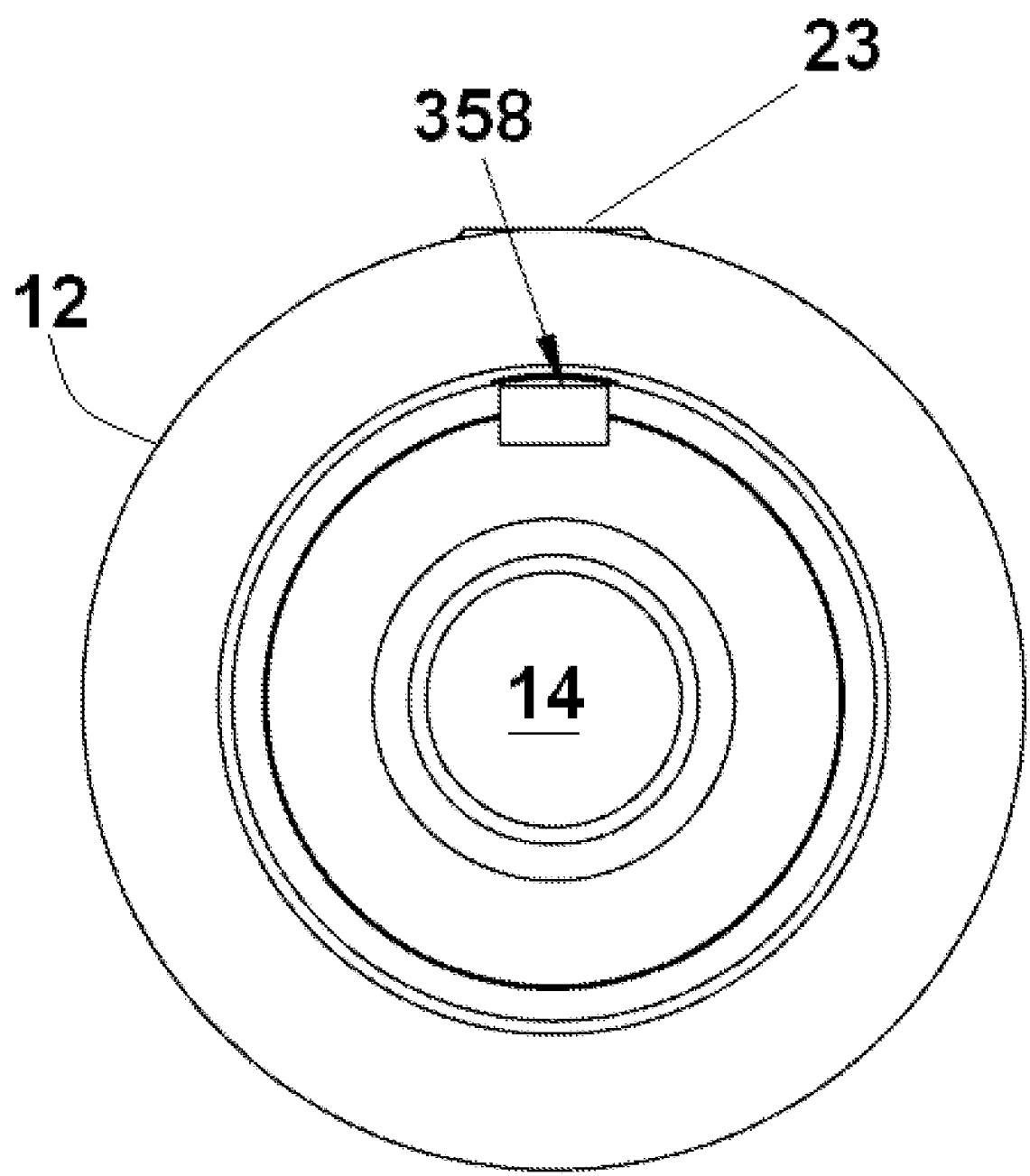
FIG. 14 is a front section view of the embodiment of the excess flow valve of FIG. 12.

An embodiment of an excess flow valve 310 is shown in FIGS. 12-14 in which the adjustment ring cooperates with the valve seat to move the valve seat within the bore of the excess flow valve, rather than cooperating with the valve guide. Both a valve seat 316 and a stationary valve guide 352 lie within the bore 14. External threading 334 lies on the exterior of the valve seat 16 and engage internal threading 36 of the adjustment ring 20. The valve seat 316 has a valve seat head 360 on the side of the valve seat 316 most distant from the stationary valve guide 352. The valve seat 316 has an anti-rotation slot 340 in the valve seat head 360 which engages an anti-rotation profile 338 that lies within an anti-rotation keyway 358 of the housing 312. In this embodiment the anti-rotation profile 338 is shown to be a square which engages a square anti-rotation slot 340. However, various types of anti-rotation profiles may be used, including for example a hex, a key or a triangle-shaped profile. A ring 356 lies within the housing 312 between the adjustment ring 20 and the valve seat head 360. The ring 356 acts to retain the adjustment ring 20 and seal between the housing 312 and the valve seat 316.

Operation of the embodiment of the excess flow valve 310 shown in FIGS. 12-14 will now be described. Rotation of the adjustment ring 20 causes the valve seat 316 to move longitudinally within the housing 312 either toward or away from the stationary valve guide 352. The anti-rotation profile 338 of the valve seat 316 engages the anti-rotation keyway 358 to prevent the valve seat 316 from rotating in unison with the adjustment ring 20. External threading 334 on the valve seat 316 is engaged by the internal threading 36 of the adjustment ring 20 to cause movement of the valve seat 316 relative to the adjustment ring 20. The movement of the valve seat 316 changes the maximum travel distance of the poppet head 68 between the stationary valve guide 352 and the valve seat 316. The spring 28 biases the poppet head 68 away from the valve seat 316. The spring 28 attaches to and biases apart the spring retainer 42 and the stationary valve guide 352.

FIG. 13 shows a section through the excess flow valve 310 of FIG. 12. The poppet head 68 lies within the bore 14 between the stationary valve guide 352 and the valve seat 316, although the poppet head 68 is not adjacent to either the stationary valve guide 352 or the valve seat 316. The flow of fluid through the excess flow valve 310 provides sufficient force to push against the compressive force of the spring 28 and move the poppet head 68 towards the valve seat 316, but the flow of fluid does not provide sufficient force to push the poppet head 68 to a closed position adjacent to the valve seat 316. The maximum distance of the poppet head 68 away from the valve seat 316 will occur when the poppet head 68 is adjacent to the stationary valve guide 352.

FIG. 14 shows a cross section of the excess flow valve 310 of FIG. 12. In the embodiment shown the anti-rotation keyway 358 is vertically aligned with the opening through the housing 22. However, in other embodiments the anti-rotation keyway 358 and anti-rotation profile 338 may not be vertically aligned with the opening through the housing 22.

Figure 15:
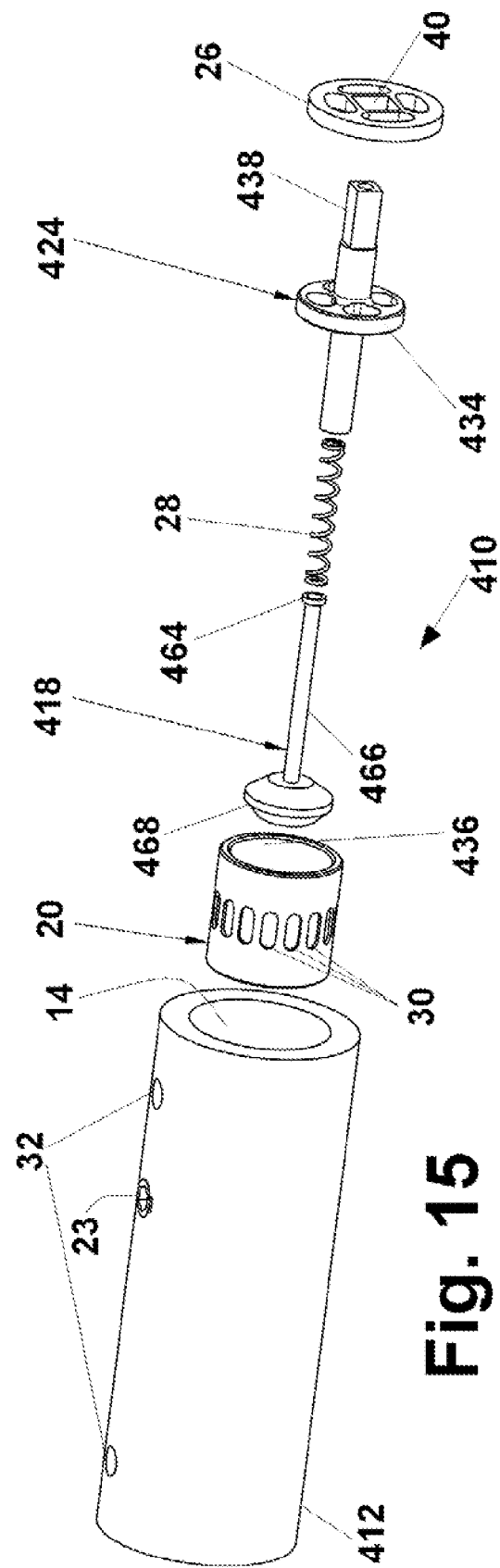
FIG. 15 is an exploded view of an embodiment of an excess flow valve.
Figure 16:
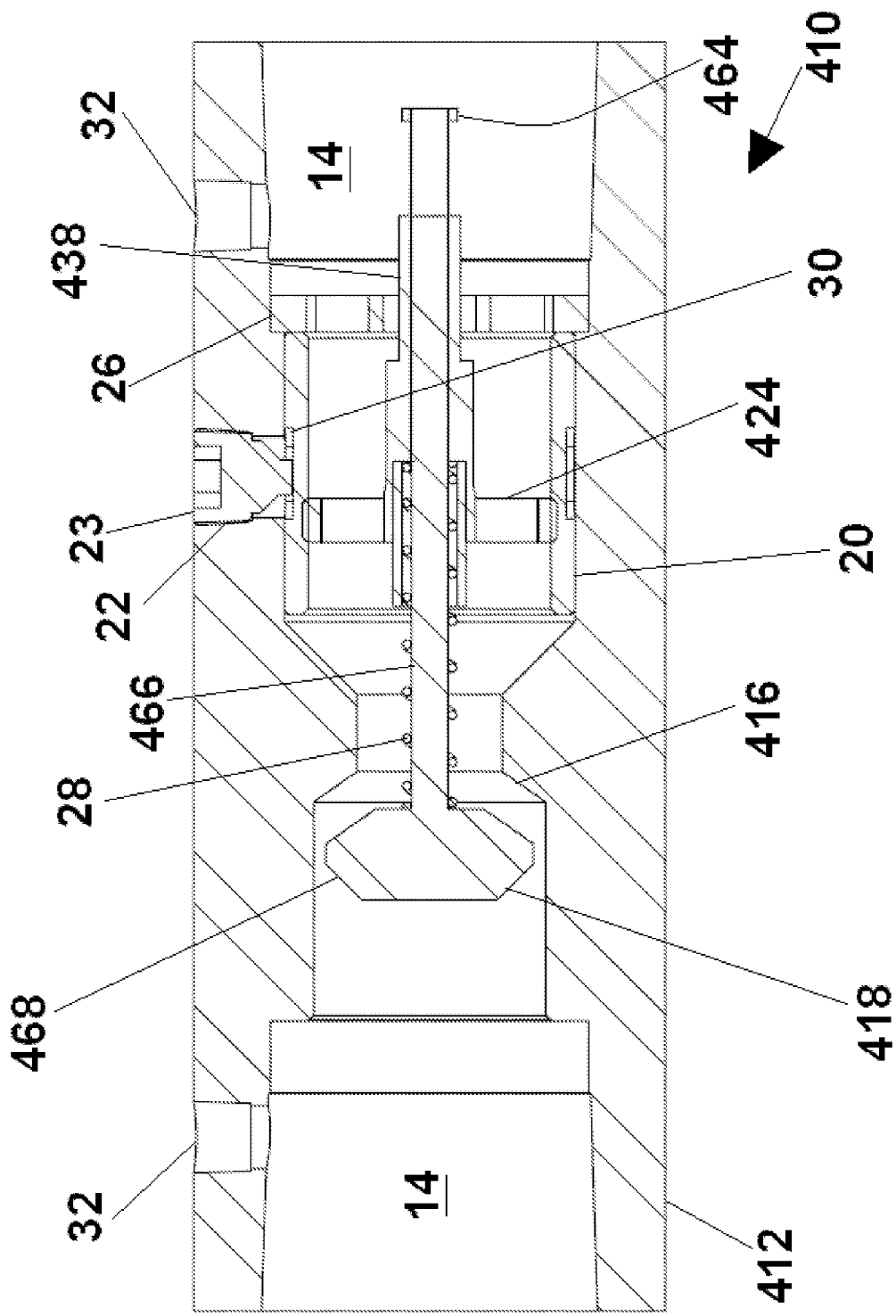
FIG. 16 is a side section view of the embodiment of the excess flow valve of FIG. 15 in an open position.

An embodiment of an excess flow valve 410 is shown in FIGS. 15 and 16 in which the valve seat lies between the poppet head and valve guide, and the position of the valve guide is adjusted by the adjustment ring. A valve seat 416 lies within the bore 14 and a poppet 418 is movable within the bore 14. The poppet 418 comprises a poppet stem 466 and a poppet head 468. The poppet 418 of this embodiment is inverted relative to the poppet 18 of the embodiment of FIGS. 1-5. The poppet head 468 in the embodiment when in the closed position seals against the valve seat 416 by the end that faces the poppet stem 466, whereas in the embodiment of FIGS. 1-5 the poppet head 68 seals against the valve seat 16 with the end that faces away from the poppet stem 66. The poppet head 468 seals the valve 410 when in contact with the valve seat 416. The travelling valve guide 424 is rotatably connected to the adjustment ring 20. A retaining member 26 lies adjacent to the adjustment ring 20 within the bore 14. A spring 28 lies between the travelling valve guide 424 and the poppet head 468. External threading 434 lies on the exterior of the travelling valve guide 424 and the external threading 434 engages internal threading 436 of the adjustment ring 20. The travelling valve guide 424 has an anti-rotation profile 438 which engages an anti-rotation slot 40 of the retaining member 26. In the embodiment shown the anti-rotation profile 438 is shown to be a square which engages a square anti-rotation slot 40. However, various types of anti-rotation profiles may be used, including for example a hex, a key or a triangle-shaped profile. The poppet stem 466 slides within a bore through the travelling valve guide 424. A poppet stop 464 lies on the opposite end of the poppet stem 466 from the poppet head 468.

Operation of the embodiment of the excess flow valve 410 shown in FIGS. 15 and 16 will now be described. In this embodiment the poppet 418 can only move in the direction from the valve seat 416 towards the travelling valve guide 424 until the poppet head 468 is adjacent to the valve seat 416. The poppet 418 can only move in the direction from the travelling valve guide towards the valve seat 16 until the poppet stop 464 is adjacent to the anti-rotation profile 438 of the travelling valve guide 424.

The manipulating device 44 may be one of a variety of devices, including for example a screw driver. A description of how the manipulating device 44 acts on the manipulating slots 30 to rotate the adjustment ring 20 follows. A wedge on the end of the manipulating 44 device is inserted into a first manipulating slot 30. The wedge pushes the manipulating slot 30 relative to the housing 12 thereby rotating the adjustment ring 20 relative to the housing 12. The wedge is then removed from the manipulating slot 30. After the rotation of the adjustment ring 20 relative to the housing 12 a second manipulating slot 30 is accessible through the housing 12 by the manipulating device 44. The wedge on the end of the manipulating device 44 is inserted into the second manipulating slot 30. Then the process is continued until a desired amount of rotation of the adjustment ring 20 is achieved. In the embodiments of FIGS. 1-5 and 10-16 the manipulating slots can be located continuously around the adjustment ring 20, and so the adjustment ring 20 may be rotated through more than one revolution. In the embodiment of FIGS. 6-9 the manipulating slots 30 may be located continuously around the adjustment ring 120 only if the keyway 50 in the housing does not intersect the circumference defined by the manipulating slots 30.

Immaterial modifications may be made to the embodiments described here without departing from what is covered by the claims. A variety of embodiments have been disclosed as examples, but other embodiments and combinations of disclosed embodiments would also fall within the claims.

What is claimed is:

1. An excess flow valve, comprising:
a housing having an inner surface defining a bore;
a flow passage within the bore;
a valve seat and a valve guide in the bore;
a poppet mounted in the bore and spring biased away from the valve seat, the poppet being limited in motion by the valve guide and the valve seat;
at least one of the valve seat and the valve guide being movable along the bore with respect to the other of the valve seat and the valve guide;
an adjustment ring mounted within the housing in the flow passage, the adjustment ring cooperating with at least one of the valve seat and the valve guide to move the respective one of the valve seat and the valve guide; and
an opening extending laterally through the housing permitting access to the adjustment ring from outside the bore of the housing;
in which the valve guide is movable within the adjustment ring and lies rotatably within the adjustment ring, and in which the valve guide further comprises a knob and the adjustment ring further comprises a cut through, and in which the knob is movable within the cut through.

2. The excess flow valve of claim 1 in which the adjustment ring is rotatably movable within the housing.

3. The excess flow valve of claim 1 in which the valve guide is movable within the adjustment ring.

4. The excess flow valve of claim 3 in which the valve guide lies rotatably within the adjustment ring.

5. The excess flow valve of claim 3 in which the poppet is spring biased by a spring connected between the poppet and the valve guide.

6. An excess flow valve, comprising:
a housing having a bore;
a valve seat and a valve guide in the bore;
a poppet mounted in the bore and spring biased away from the valve seat, the poppet being limited in motion by the valve guide and the valve seat;
at least one of the valve seat and the valve guide being movable along the bore with respect to the other of the valve seat and the valve guide;
an adjustment ring mounted within the housing in the bore, the adjustment ring cooperating with at least one of the valve seat and the valve guide to move the respective one of the valve seat and the valve guide; and
an opening through the housing permitting access to the adjustment ring from outside the bore of the housing, in which the adjustment ring has multiple manipulating slots accessible through the opening through the housing.

7. An excess flow valve, comprising:
a housing having a bore;
a valve seat and a valve guide in the bore;
a poppet mounted in the bore and spring biased away from the valve seat, the poppet being limited in motion by the valve guide and the valve seat;

at least one of the valve seat and the valve guide being movable along the bore with respect to the other of the valve seat and the valve guide;

an adjustment ring mounted within the housing in the bore, the adjustment ring cooperating with at least one of the valve seat and the valve guide to move the respective one of the valve seat and the valve guide;

an opening through the housing permitting access to the adjustment ring from outside the bore of the housing; and a pipe plug to seal the opening through the housing, in which the pipe plug further comprises a spigot, the spigot engaging with the adjustment ring to prevent rotation of the adjustment ring, and in which the adjustment ring further comprises multiple manipulating slots accessible through the opening through the housing and the spigot engages with at least one of the manipulating slots of the adjustment ring.

* * * * *